US008694063B2

(12) United States Patent
Hung et al.

(10) Patent No.: US 8,694,063 B2
(45) Date of Patent: Apr. 8, 2014

(54) RADIO-FREQUENCY DEVICE, WIRELESS COMMUNICATION DEVICE AND METHOD FOR ENHANCING ANTENNA ISOLATION

(75) Inventors: Tso-Ming Hung, Hsinchu (TW); Jhih-Yuan Ke, Hsinchu (TW); Chih-Sen Hsieh, Hsinchu (TW); Ming-Feng Chang, Hsinchu (TW); Chih-Ming Wang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 29 days.

(21) Appl. No.: 13/421,874

(22) Filed: Mar. 16, 2012

(65) Prior Publication Data

US 2013/0189934 A1 Jul. 25, 2013

(30) Foreign Application Priority Data

Jan. 20, 2012 (TW) ............................. 101102630 A

(51) Int. Cl.
*H04M 1/00* (2006.01)

(52) U.S. Cl.
USPC ..................................... 455/575.7; 455/562.1

(58) Field of Classification Search
USPC .................... 455/82, 83, 562.1, 575.7, 279.1; 343/702, 844
See application file for complete search history.

(56) References Cited

U.S. PATENT DOCUMENTS

| | | | | |
|---|---|---|---|---|
| 7,688,275 | B2 * | 3/2010 | Montgomery et al. | 343/844 |
| 8,344,956 | B2 * | 1/2013 | Montgomery et al. | 343/702 |
| 2008/0106476 | A1 * | 5/2008 | Tran et al. | 343/702 |

* cited by examiner

*Primary Examiner* — Sonny Trinh
(74) *Attorney, Agent, or Firm* — Winston Hsu; Scott Margo

(57) ABSTRACT

A radio-frequency (RF) device for a wireless communication device includes an antenna disposition area, and a plurality of antennas of a same type, formed in the antenna disposition area by different arrangements, for receiving or transmitting a plurality of wireless signals of a same frequency band.

15 Claims, 16 Drawing Sheets

RADIO-FREQUENCY DEVICE, WIRELESS COMMUNICATION DEVICE AND METHOD FOR ENHANCING ANTENNA ISOLATION

BACKGROUND OF THE INVENTION

1. Field of the Invention

The present invention relates to a radio-frequency device, wireless communication device and method, and more particularly, to a radio-frequency device, wireless communication device and method capable of enhancing antenna isolation and maintaining throughput.

2. Description of the Prior Art

An electronic product with a wireless communication function, e.g. a laptop, a personal digital assistant, etc., utilizes an antenna to emit or receive radio waves, to transmit or exchange radio signals, so as to access a wireless network. Therefore, to facilitate a user's access to the wireless communication network, an ideal antenna should maximize its bandwidth within a permitted range, while minimizing physical dimensions to accommodate the trend for smaller-sized electronic products. Additionally, with the advance of wireless communication technology, electronic products may be configured with an increasing number of antennas. For example, a long-term evolution (LTE) wireless communication system and a wireless local area network standard IEEE 802.11n both support multi-input multi-output (MIMO) technology, i.e. an electronic product is capable of simultaneously receiving and transmitting wireless signals via multiple (or multiple sets of) antennas, to vastly increase system throughput and transmission distance without increasing system bandwidth or total transmit power expenditure, thereby effectively enhancing spectral efficiency and transmission rate for the wireless communication system, as well as improving communication quality.

As can be seen, a prerequisite for implementing spatial multiplexing and spatial diversity of MIMO is to employ multiple antennas to divide a space into many channels, so as to provide multiple antenna field patterns. Therefore, it is a common goal in the industry to design antennas that suit transmission demands, as well as dimension and functionality requirements.

In addition, with the advance of wireless communication technology, various wireless communication systems are developed, such as mobile communication systems (e.g. GSM, 3G, LTE), wireless local area networks (e.g. Wi-fi, Wimax), wireless personal local area networks (e.g. Bluetooth, Zigbee), etc. In order to prevent interferences among the communication systems, operating frequency bands and communication techniques, such as modulation, encoding, encryption, etc., employed by the communication systems are usually different. However, under the limitation of wireless communication resources, some of the communication systems have to share the same operating frequency band, leading to an interference issue.

For example, according to communication protocols of Bluetooth and Wi-Fi, i.e. IEEE 802.15.1 and IEEE 802.11, the operating frequency bands thereof are defined around 2.4 GHz (5 GHz employed in IEEE 802.11a) within an industrial scientific medical (ISM) band. The ISM band is world-wide reserved for industrial, scientific and medical usages, and can be utilized without permission if some regulations are followed, to prevent affecting other frequency bands. In such a situation, even though the communication protocols, modulating methods and encoding methods of Bluetooth and Wi-Fi are different, "collision" may occur because of the same operating frequency band. "Collision" herein means that a Bluetooth (or Wi-Fi) receiver simultaneously receives Bluetooth and Wi-Fi signals, leading to operating faults.

When a Bluetooth system and a Wi-Fi system collide, the Wi-Fi system can retransmit signals to a receiver based on an automatic repeat request (ARQ) scheme and decrease a transmission rate based on a rate adaptation scheme, to increase the ratio of successful transmissions. However, compared to Wi-Fi, Bluetooth is a low-power wireless connection technique. That is, a Wi-Fi signal can easily saturate a Bluetooth receiver. In detail, when a wireless receiver receives wireless signals, an amplifier gain thereof is adjusted according to transmission conditions, to efficiently convert RF signals to baseband for operations of demodulation and decoding. In such a situation, when Bluetooth and Wi-Fi collide, the Bluetooth receiver may be malfunctioned because a received Wi-Fi signal with stronger power causes the amplifier saturated. Even worse, when collision happens, a Wi-Fi transmitter decreases the transmission rate, causing a longer transmission period of a packet, such that the probability of collision is higher, finally leading to a fatal fault.

For example, a computer system accesses internet via Wi-Fi and communicates with peripherals, such as headsets, wireless keyboard, wireless mouse, etc., via Bluetooth. When collision between Wi-Fi and Bluetooth occurs, a user can still surf internet via Wi-Fi with a lower transmission rate, but cannot use the Bluetooth peripherals, which degrades utilization convenience.

Note that, Bluetooth and Wi-Fi are taken for example since Bluetooth and Wi-Fi are usually employed in the same electronic product, such as the laptop, the PDA, etc., such that collision is obvious and crucial. In general, the most effective method for improving collision is to enhance antenna isolation. However, under the limitation of spaces, increasing the difficulties of design is necessary in order to enhance antenna isolation while maintaining throughput of MIMO.

Therefore, it is a common goal in the industry to increase isolation among multiple antennas and maintain throughput under the limitation of spaces.

SUMMARY OF THE INVENTION

It is therefore an objective of the present invention to provide a radio-frequency device, a wireless communication device and a method capable of enhancing antenna isolation.

An embodiment discloses a radio-frequency (RF) device for a wireless communication device. The RF device includes an antenna disposition area, and a plurality of antennas, having a same type, and formed in the antenna disposition area by different arrangements, for receiving or transmitting a plurality of wireless signals of a same frequency band.

Another embodiment discloses a wireless communication device. The wireless communication device includes a radio-frequency (RF) signal processing device, for processing a plurality of RF signals of a same frequency band, and an RF device, including an antenna disposition area, and a plurality of antennas, having a same type, and formed in the antenna disposition area by different arrangements and coupled to the RF signal processing device, for receiving or transmitting the plurality of wireless signals.

Further another embodiment discloses a method for enhancing antenna isolation. The method includes designing a plurality of antennas of a same type according to an operating frequency band of a wireless communication device, and forming the plurality of antennas in an antenna disposition area of the wireless communication device by different arrangements, for receiving or transmitting a plurality of wireless signals of the operating frequency band.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
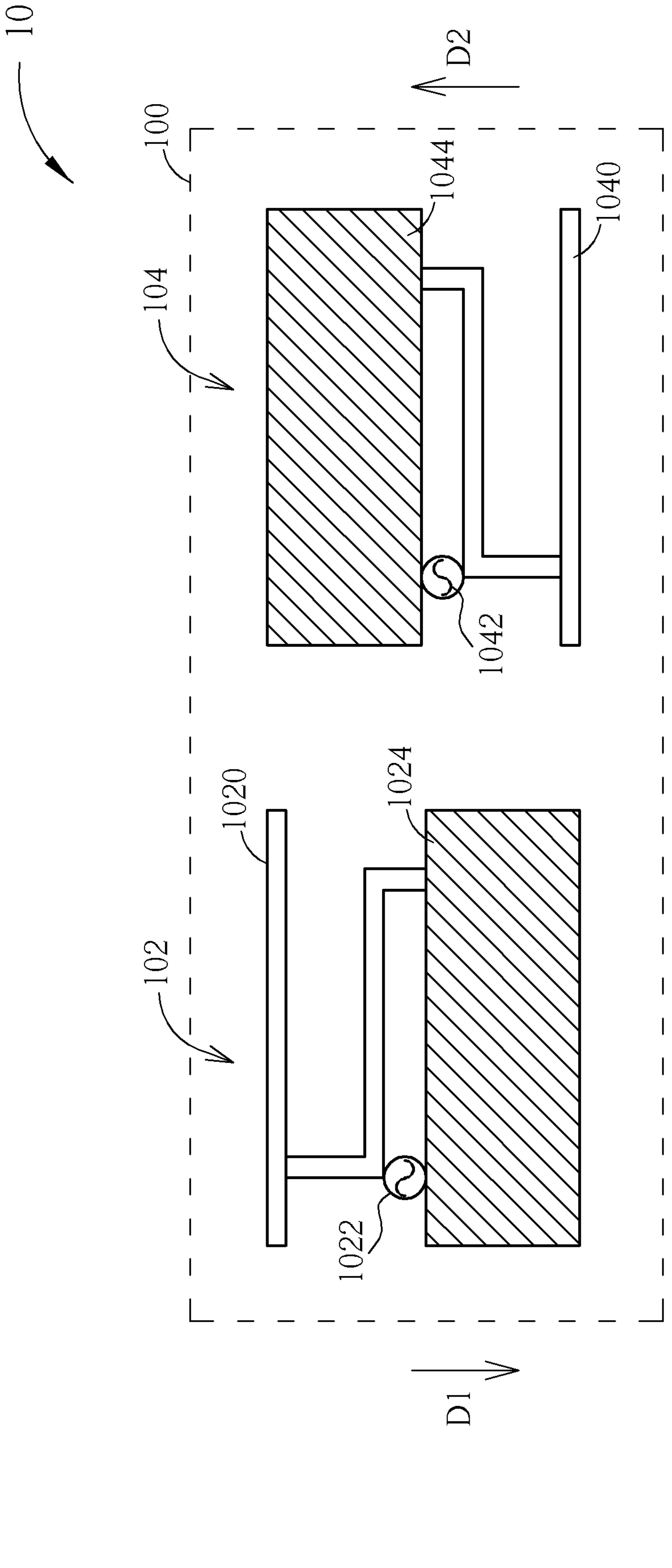
FIG. 1 is a schematic diagram of a radio-frequency (RF) device according to an embodiment of the present invention.

Please refer to FIG. 1, which is a schematic diagram of a radio-frequency (RF) device 10 according to an embodiment of the present invention. The RF device 10 is utilized for a wireless communication device having wireless communication functions. More specifically, the wireless communication device can support simultaneously receiving or transmitting multiple wireless signals of a same frequency band, and the RF device 10 can ensure isolation under such an operation. The term "simultaneously receiving or transmitting multiple wireless signals of the same frequency band" means that a wireless communication system supporting multi-input multi-output (MIMO) technology, such as LTE, IEEE 802.11n, etc., simultaneously receives or transmits wireless signals, or different wireless communication systems applying the same frequency band, such as Bluetooth and Wi-Fi, simultaneously receive or transmit wireless signals. As shown in FIG. 1, the RF device 10 includes a first antenna 102 and a second antenna 104 set in an antenna disposition area 100. The first antenna 102 and the second antenna 104 are of the same type, for receiving or transmitting wireless signals of the same frequency band, but formed in the antenna disposition area 100 by different arrangements.

In detail, the first antenna 102 includes a radiating element 1020, a feed-in terminal 1022 and a grounding element 1024; similarly, the second antenna 104 includes a radiating element 1040, a feed-in terminal 1042 and a grounding element 1044. Comparing the first antenna 102 and the second antenna 104 can know that components of the first antenna 102 and the second antenna 104 are identical, and thus the operating principles are the same. A difference between the first antenna 102 and the second antenna 104 is that as shown in FIG. 1, a direction of the radiating element 1020 to the grounding terminal 1024 of the first antenna 102 is from top to bottom (i.e. direction D1), while a direction of the radiating element 1040 to the grounding terminal 1044 of the second antenna 104 is from bottom to top (i.e. direction D2). By different arrangements (or placements), the first antenna 102 and the second antenna 104 can have good isolation to achieve requirements for simultaneously receiving or transmitting wireless signals of the same frequency band. As those skilled in the art recognized, well antenna isolation can avoid collision when simultaneously receiving or transmitting wireless signals, and thereby increase antenna efficiency and maintain throughput.

Figure 2:
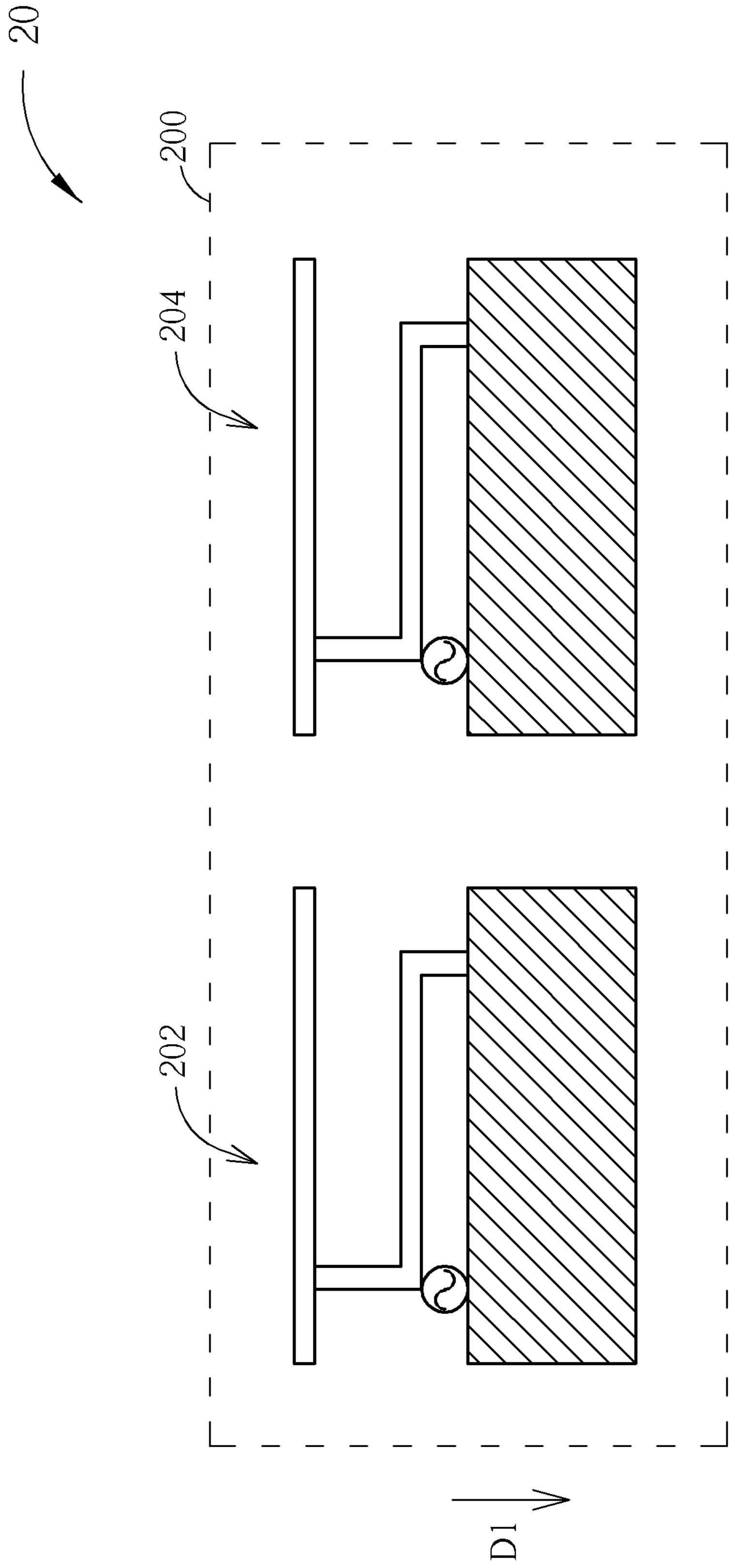
FIG. 2 is a schematic diagram of an RF device.
Figure 3A:
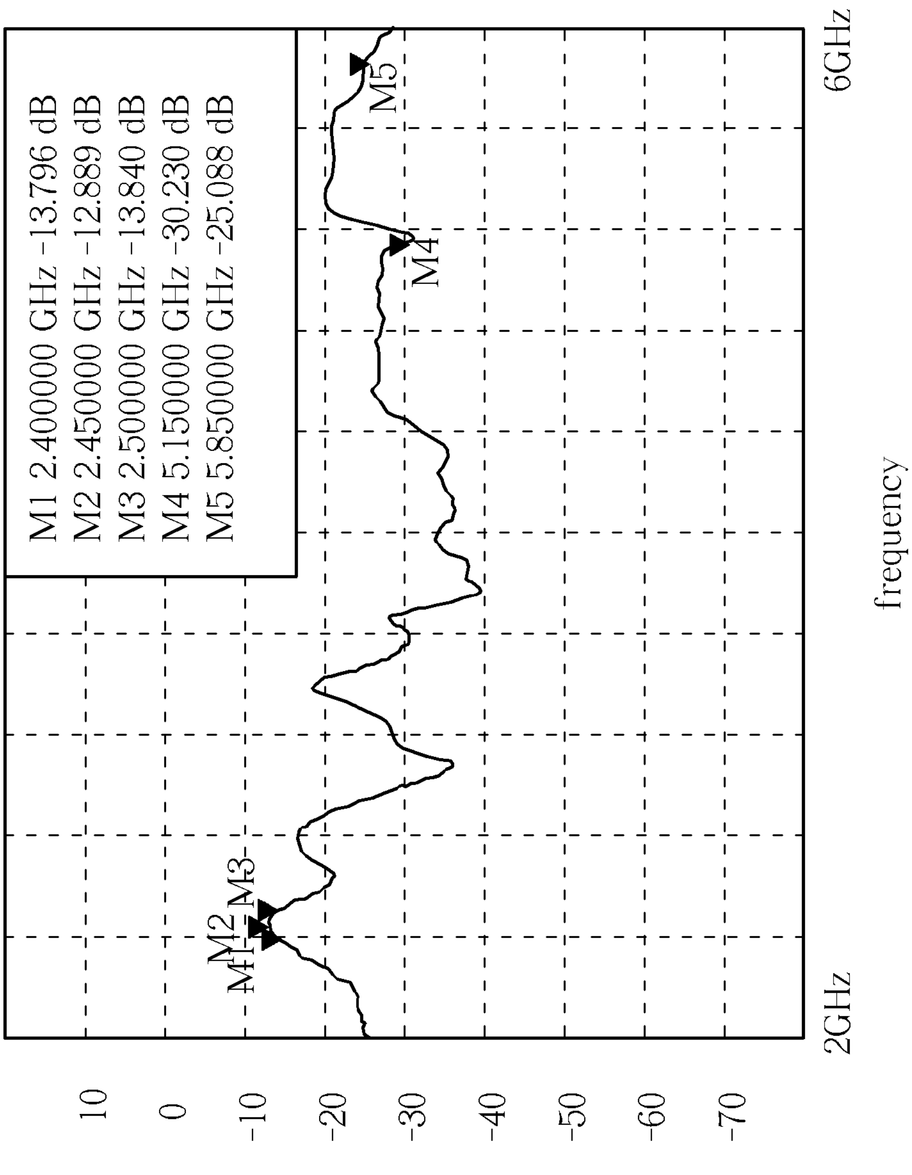
FIG. 3A is a schematic diagram of isolation between two antennas in the RF device shown in FIG. 2.
Figure 3B:
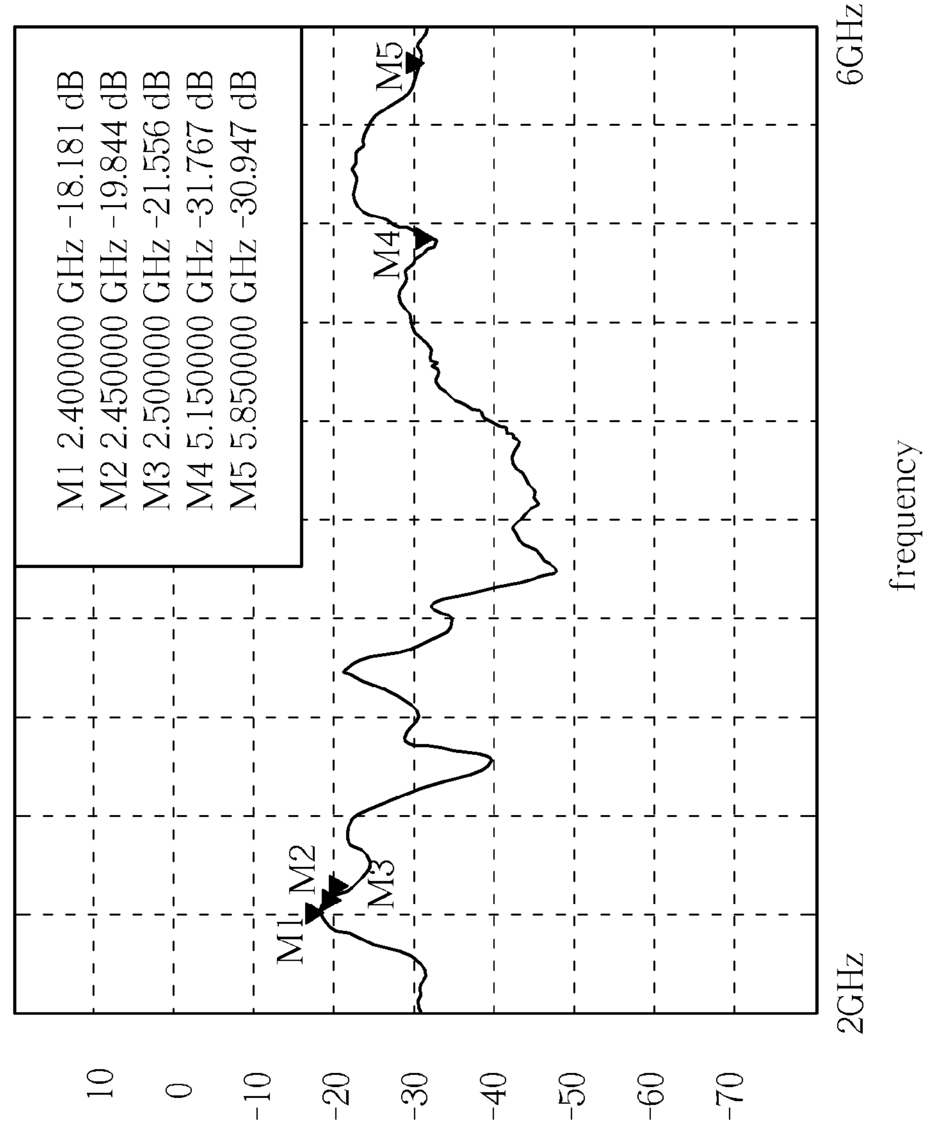
FIG. 3B is a schematic diagram of isolation between two antennas in the RF device shown in FIG. 1.
Figure 4:
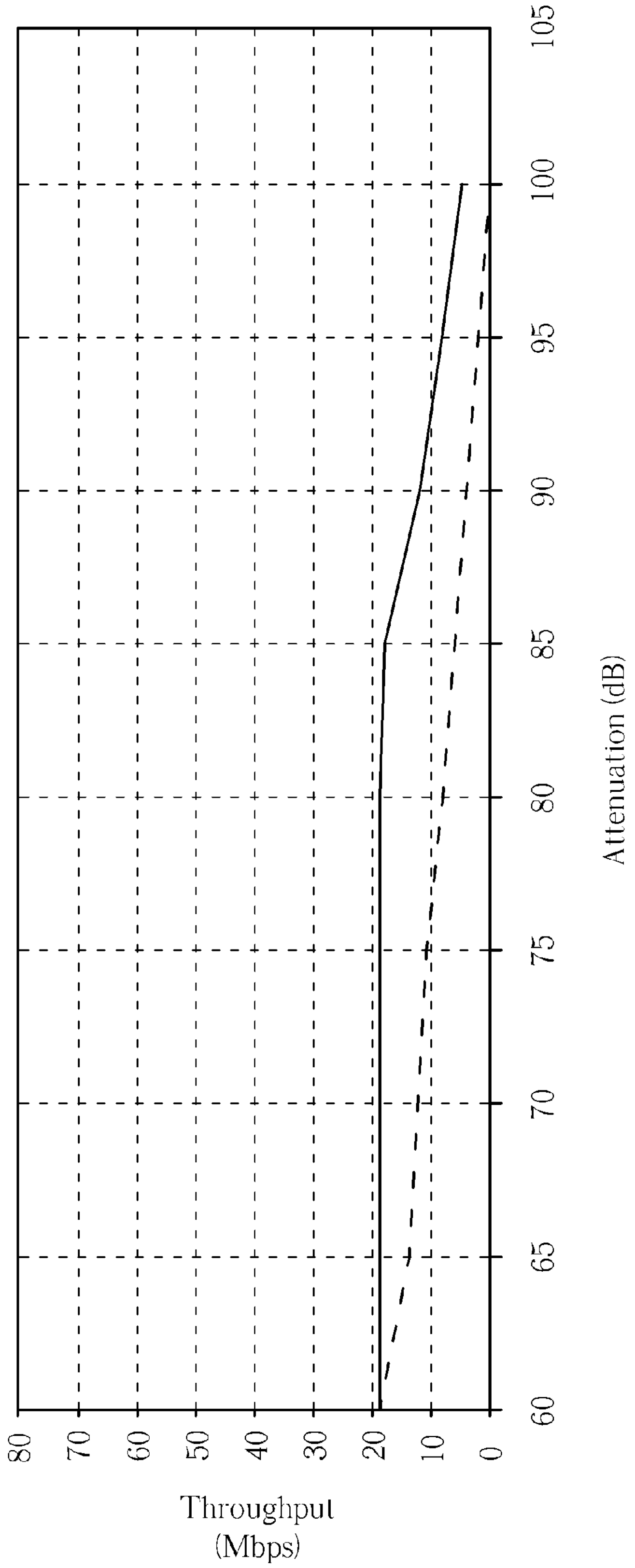
FIG. 4 is a comparison schematic diagram of throughputs of the RF device shown in FIG. 2 and the RF device shown in FIG. 1.

For example, please refer to FIG. 2, which is a schematic diagram of an RF device 20. A structure of the RF device 20 is similar to that of the RF device 10. The RF device 20 also includes a first antenna 202 and a second antenna 204. Similar to the first antenna 102 and the second antenna 104 shown in FIG. 1, the first antenna 202 and the second antenna 204 are also of the same type; however, the first antenna 202 and the second antenna 204 are formed in an antenna disposition area 200 by the same arrangement, i.e. directions from radiating elements to grounding terminals of the first antenna 202 and the second antenna 204 are from top to bottom. Please continue to refer to FIG. 3A and FIG. 3B, which are schematic diagrams of isolations between two antennas in the RF device 20 and the RF device 10, respectively. As can be seen from FIG. 3A and FIG. 3B, although components of the RF device 20 are similar to those of the RF device 10, by different arrangements between two antennas, the RF device 10 can effectively increase isolation. Furthermore, please refer to FIG. 4, which is a schematic diagram of throughputs of the RF device 20 and the RF device 10, as denoted by dotted line and solid line, respectively. As can be seen from FIG. 4, the RF device 10 can effectively increase isolation and throughput, which adapts to applications for simultaneously receiving or transmitting two wireless signals of a same frequency band.

As can be seen, with different arrangements of the first antenna 102 and the second antenna 104, the RF device 10 can maintain isolation between the first antenna 102 and the second antenna 104, to meet the requirements for simultaneously receiving or transmitting wireless signals of the same frequency band. Note that, the antenna arrangements mentioned above are defined, but not limited to be, based on the direction from the radiating element to the grounding terminal, and other criteria for defining the antenna arrangements can be used in the present invention. For example, a position of the radiating element relative to the grounding terminal or the feed-in terminal, a position of the grounding terminal relative to the radiating element or the feed-in terminal, and relative positions of a high frequency part and a low frequency part in the radiating element, etc.

Figure 5:
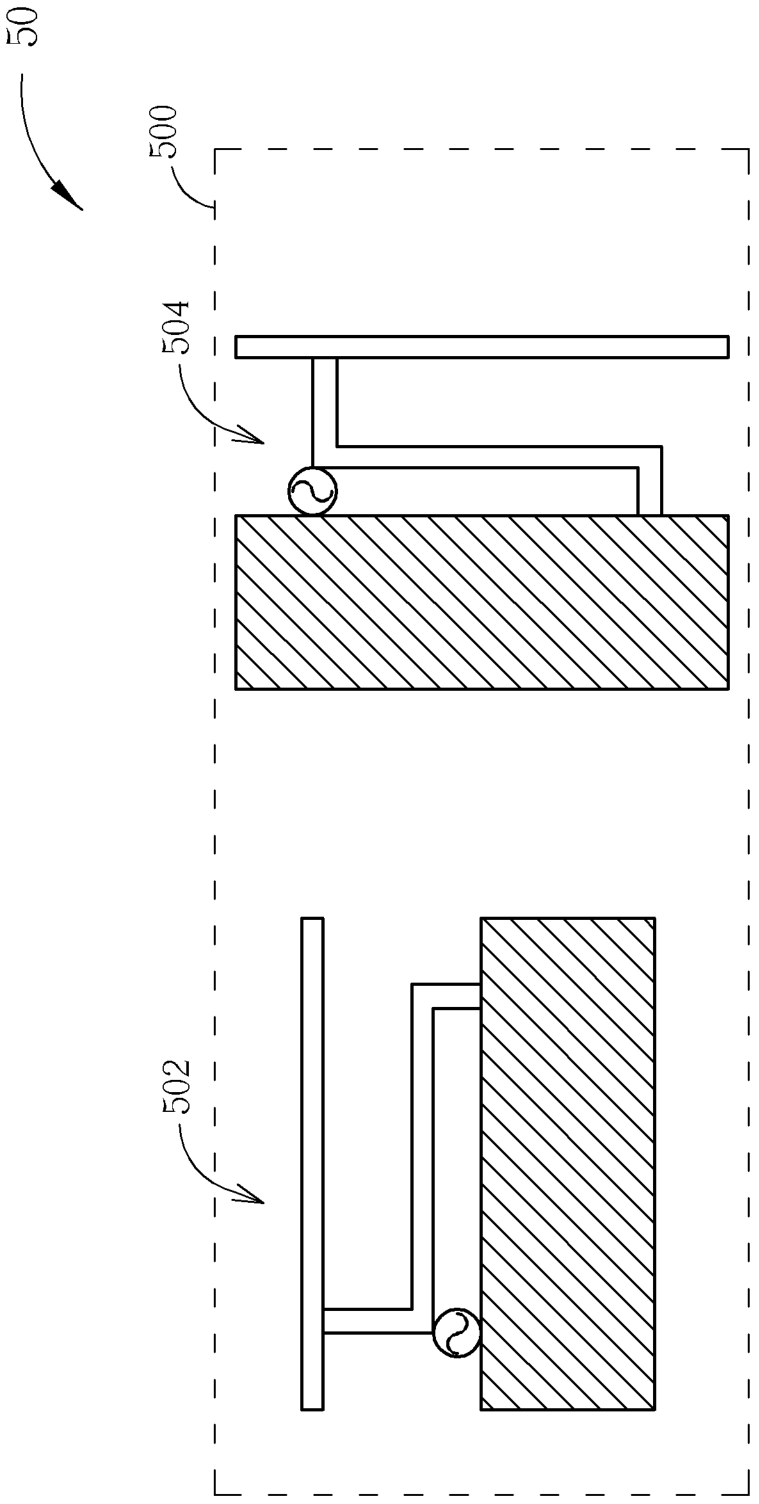
FIG. 5 is a schematic diagram of an RF device according to an embodiment of the present invention.
Figure 6:
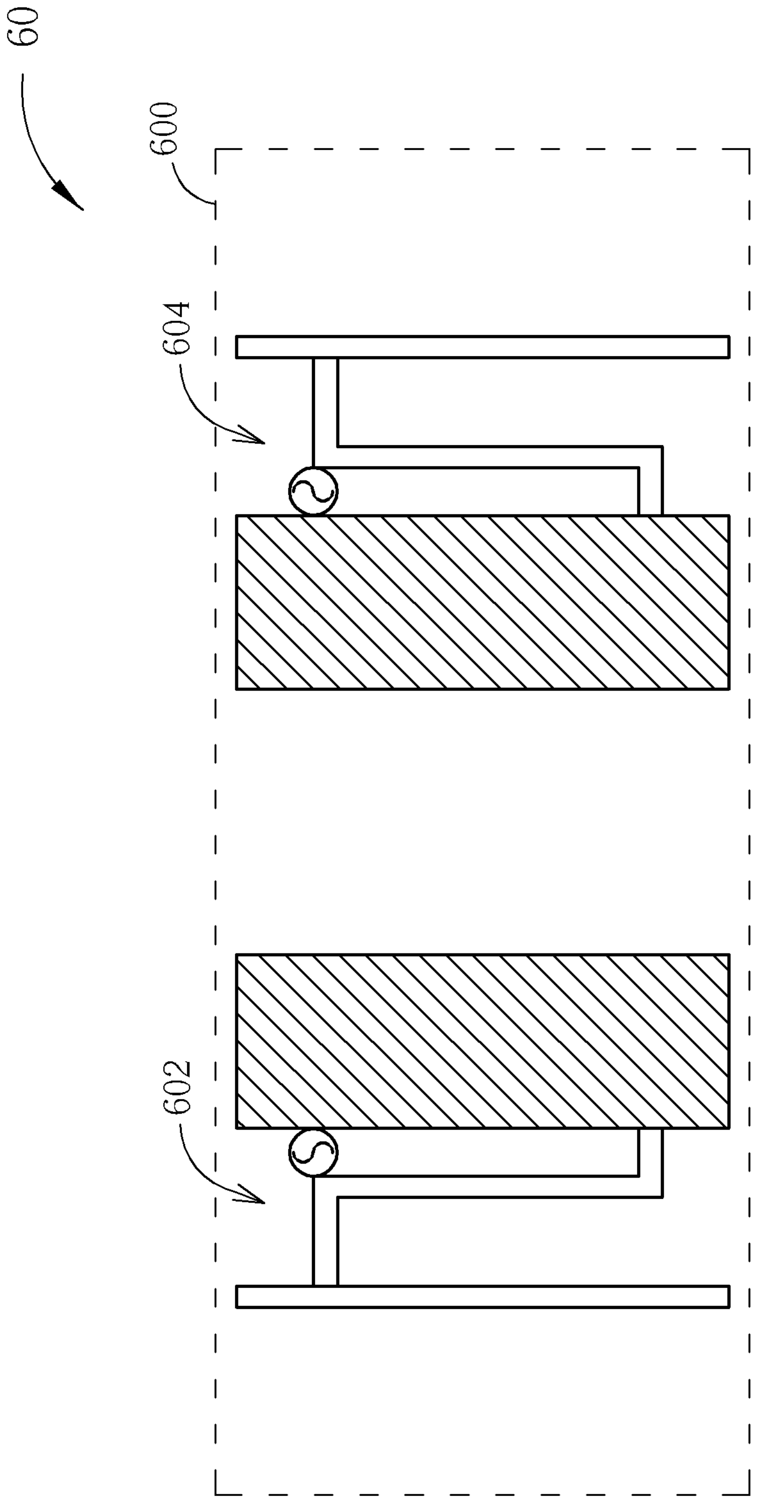
FIG. 6 is a schematic diagram of an RF device according to an embodiment of the present invention.
Figure 7B:
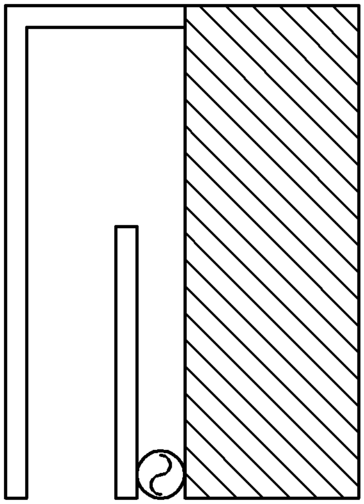
FIG. 7A to FIG. 7E are schematic diagrams of antennas with different structures.
Figure 7A:
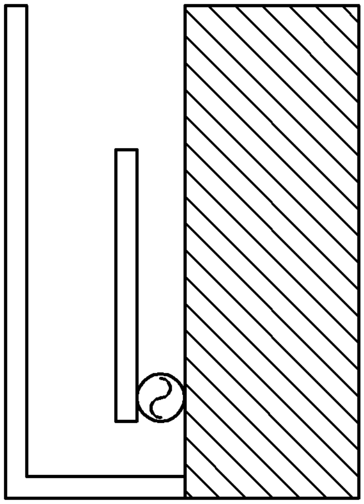
Figure 7E:
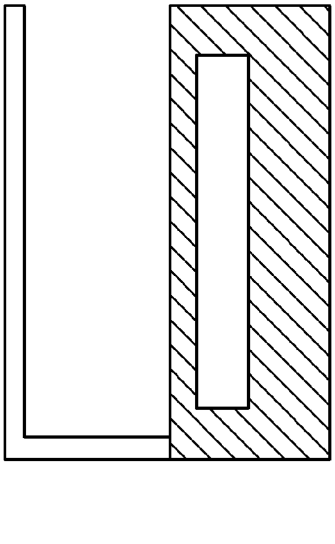
Figure 7D:
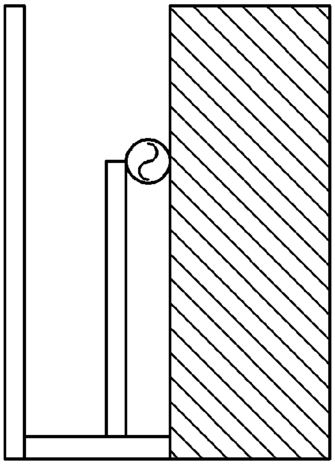
Figure 7C:
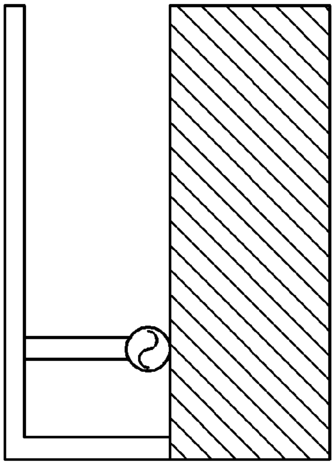

In addition, in FIG. 1, the first antenna 102 and the second antenna 104 are upside down; however, other arrangements can be applied. For example, FIG. 5 is a schematic diagram of an RF device 50 according to an embodiment of the present invention. A structure of the RF device 50 is similar to that of the RF device 10. The RF device 50 also includes a first antenna 502 and a second antenna 504 of the same type in an antenna disposition area 500. A direction from a radiating element to a grounding terminal of the first antenna 502 is from top to bottom, and a direction from a radiating element to a grounding terminal of the second antenna 504 is from right to left; thus, isolation of the RF device 50 can be enhanced. In addition, FIG. 6 is a schematic diagram of an RF device 60 according to an embodiment of the present invention. A structure of the RF device 60 is similar to that of the RF device 10. The RF device 60 also includes a first antenna 602 and a second antenna 604 of the same type in an antenna disposition area 600. A direction from a radiating element to a grounding terminal of the first antenna 602 is from left to right, and a direction from a radiating element to a grounding terminal of the second antenna 604 is from right to left; thus, isolation of the RF device 60 can be enhanced.

FIG. 5 and FIG. 6 illustrate that the different arrangements qualified for enhancing isolation in the present invention are not limited to the upside down arrangements, and can be properly adjusted according to system or design requirements. In addition, in FIG. 1, the first antenna 102 and the second antenna 104 are zigzag planar antennas with different arrangements. Those skilled in the art may design appropriate antennas according to the requirements, such as planar inverted-F antennas, dipole antennas, foldable dipole antennas, slot antennas, etc.

For example, FIG. 7A to FIG. 7E are schematic diagrams of different antennas, which can realize the first antenna 102 and the second antenna 104. Certainly, designers can select suitable antennas from FIG. 7A to FIG. 7E, and properly adjust, or re-design the antennas depending on system requirements.

Figure 8A:
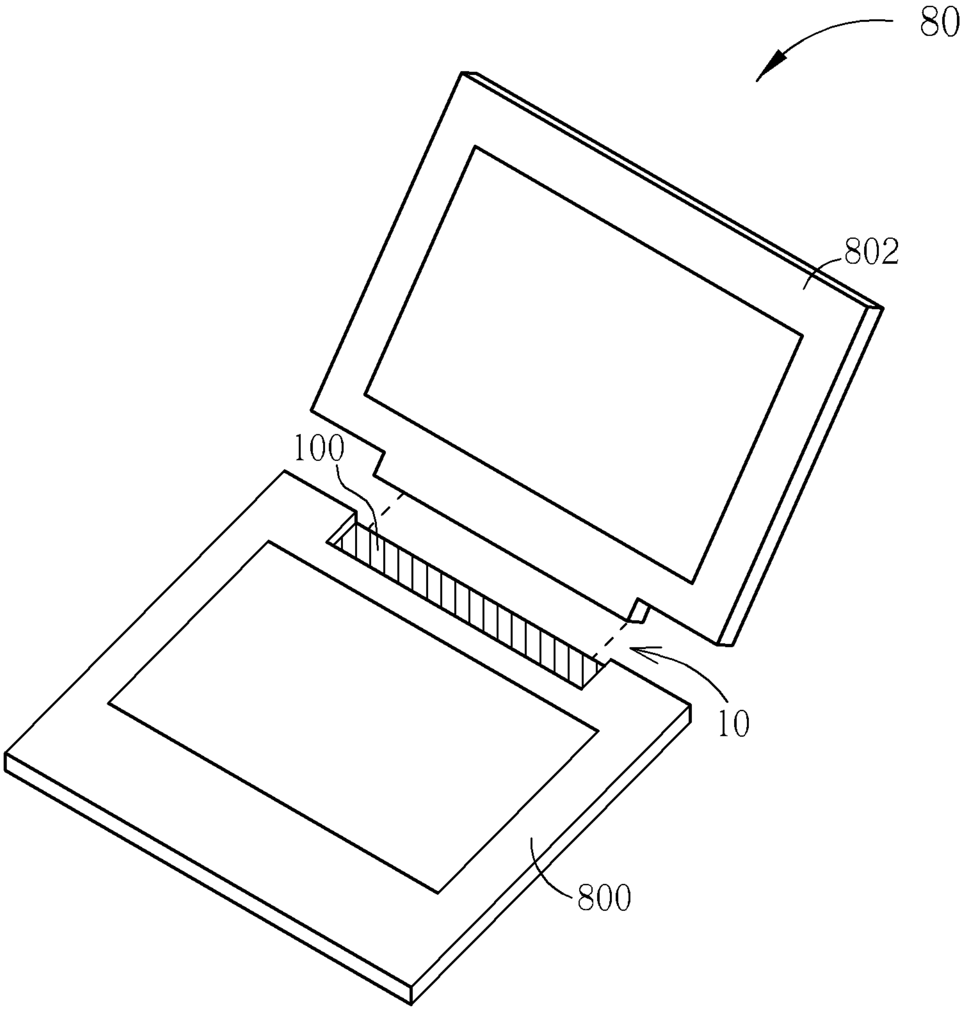
FIG. 8A is a schematic diagram of a laptop equipped with the RF device shown in FIG. 1.

On the other hand, in FIG. 1, the antenna disposition area 100 can be an area for disposing antennas in a wireless communication device. For example, please refer to FIG. 8A, which is a schematic diagram of a laptop 80 according to an embodiment of the present invention. The laptop 80 includes a base 800 and a screen 802 conjoined by a hinge (and a flexible circuit board). In such a condition, as shown in FIG. 8A, the antenna disposition area 100 can be a hinge area utilized for connecting the hinge in the base 800 of the laptop 80, i.e. the RF device 10 is set in the base 800. As a result, when the screen 802 of the laptop 80 rotates, the RF device 10 set in the base 800 does not rotate, to ensure consistency of antenna characteristics, and maintain antenna efficiency.

Figure 8B:
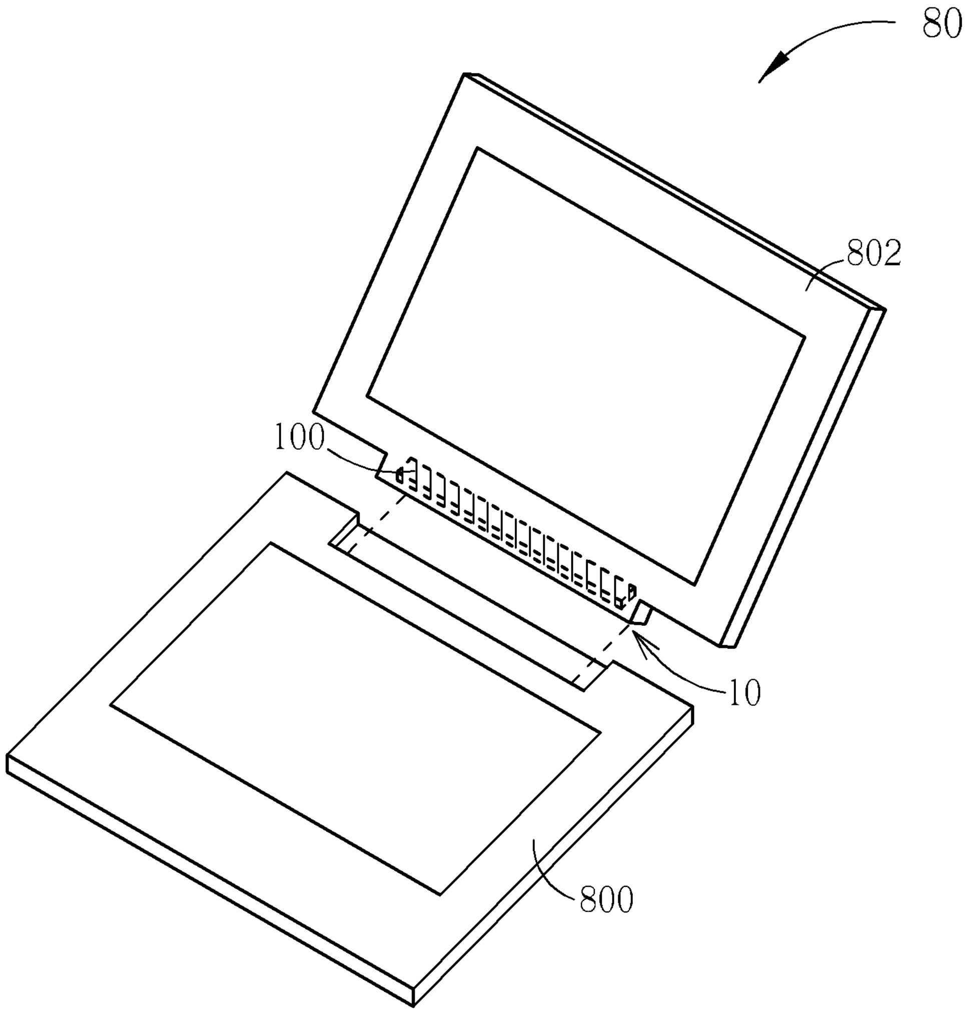
FIG. 8B is a schematic diagram of another laptop equipped with the RF device shown in FIG. 1.

FIG. 8A illustrates an area of the laptop 80 for disposing the RF device 10. In addition, the RF device 10 can be disposed in other areas of the laptop 80. For example, in FIG. 8B, the RF device 10 is disposed under the screen 802 of the laptop 80, which can also maintain isolation, and avoid collision during simultaneously receiving or transmitting wireless signals, wherein the antenna disposition area 100 can be a hinge area under the screen 802. On the other hand, the RF device 10 can be applied to a mobile phone, a tablet computer, a wireless access point equipment, or other wireless communication device with wireless communication functions. Employing the RF device 10 (or other embodiments) in a wireless communication device with wireless communication functions should be well known for those skilled in the art. For example, the first antenna 102 and the second antenna 104 in the RF device 10 should be coupled to an RF signal processing device in the wireless communication device, such that the RF signal processing device can use the isolation feature of the first antenna 102 and the second antenna 104 to process a plurality of RF signals of the same frequency band, so as to simultaneously receive or transmit multiple wireless signals of the same frequency band.

In the above embodiments, the antenna disposition areas are planar to facilitate illustration. However, in the present invention, the antenna disposition areas represent areas utilized for disposing antennas in wireless communication devices. In other words, the antenna disposition areas are not limited to be two-dimensions, and can be three-dimensional or formed by multiple fragment areas. For example, please refer to FIG. 10A to FIG. 10D, which are an isometric-view diagram, a side-view diagram, a top-view diagram and a bottom-view diagram of a tubular mechanism 11 according to an embodiment of the present invention. The tubular mechanism 11 can be apart of a hinge structure of a laptop, and includes a first antenna 112 and a second antenna 114 according to the present invention. The first antenna 112 and the second antenna 114 are of the same type with different arrangements, and formed in a front side and a back side of the tubular mechanism 11, such that can enhance antenna isolation, and avoid collision when simultaneously receiving or transmitting wireless signals, to maintain throughput.

Figure 9:
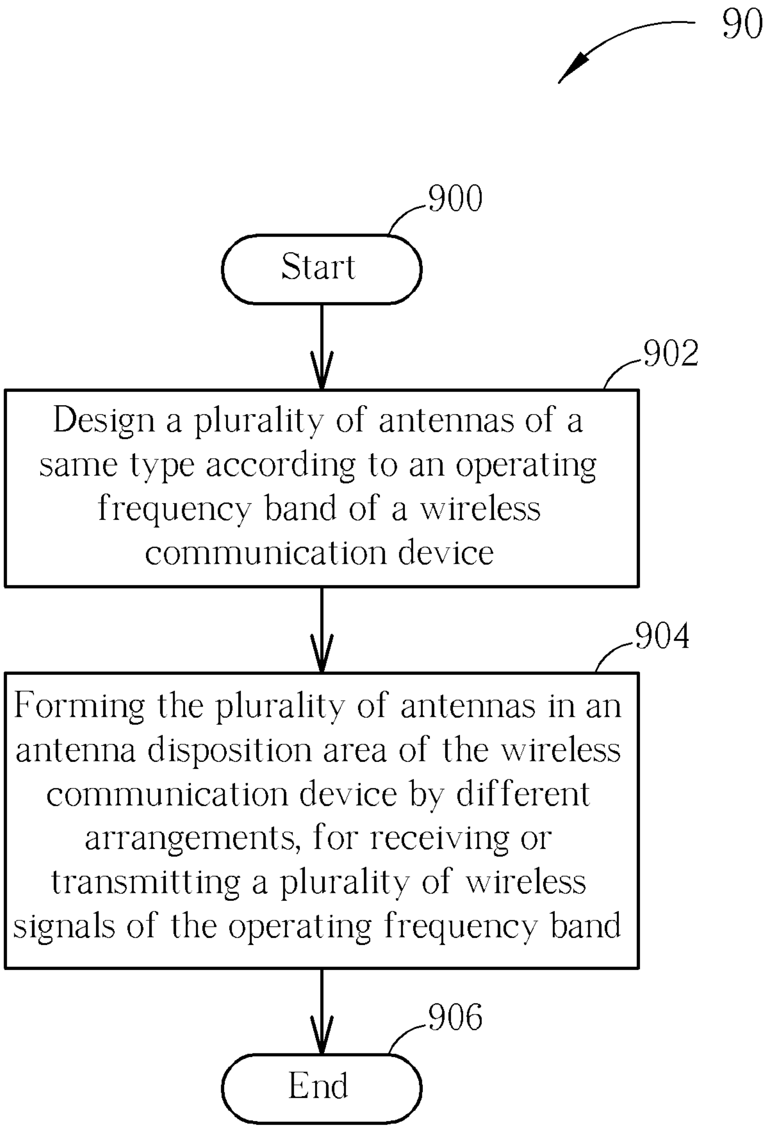
FIG. 9 is a flowchart for enhancing antenna isolation according to an embodiment of the present invention.
Figure 10A:
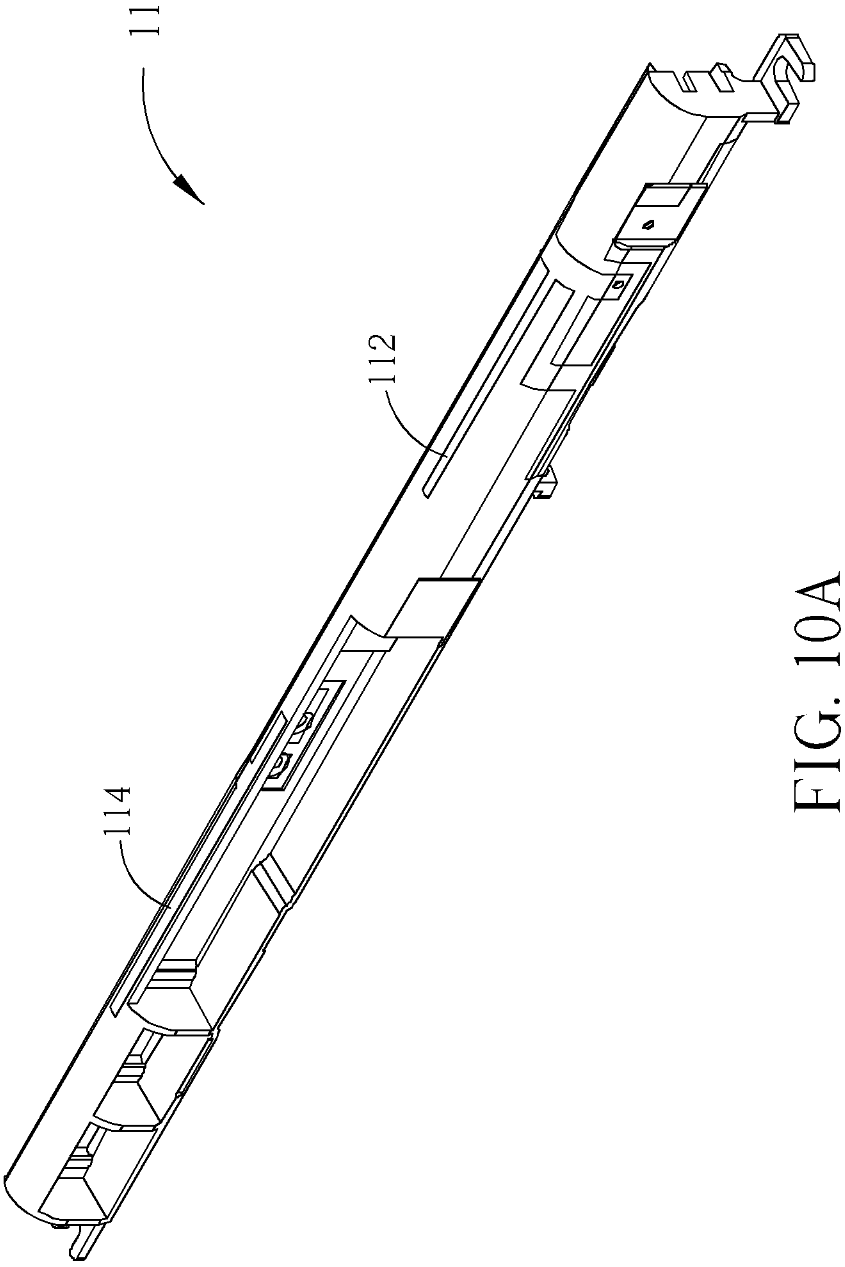
FIG. 10A to FIG. 10D are an isometric-view diagram, a side-view diagram, a top-view diagram and a bottom-view diagram of a tubular mechanism according to an embodiment of the present invention.
Figure 10B:
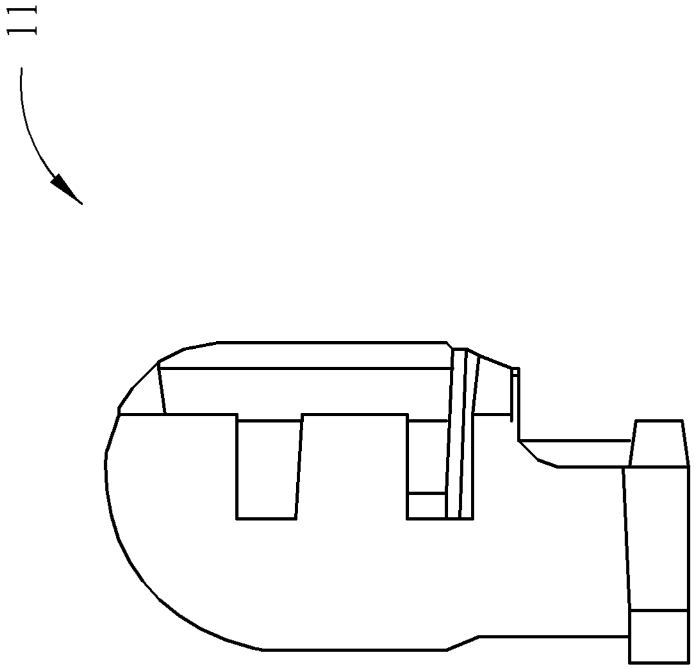
Figure 10C:
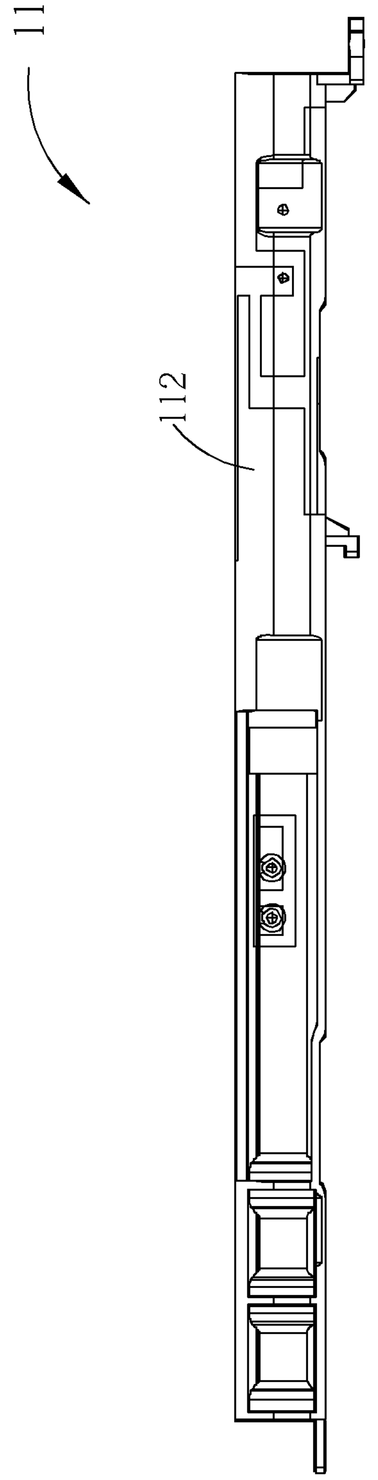
Figure 10D:
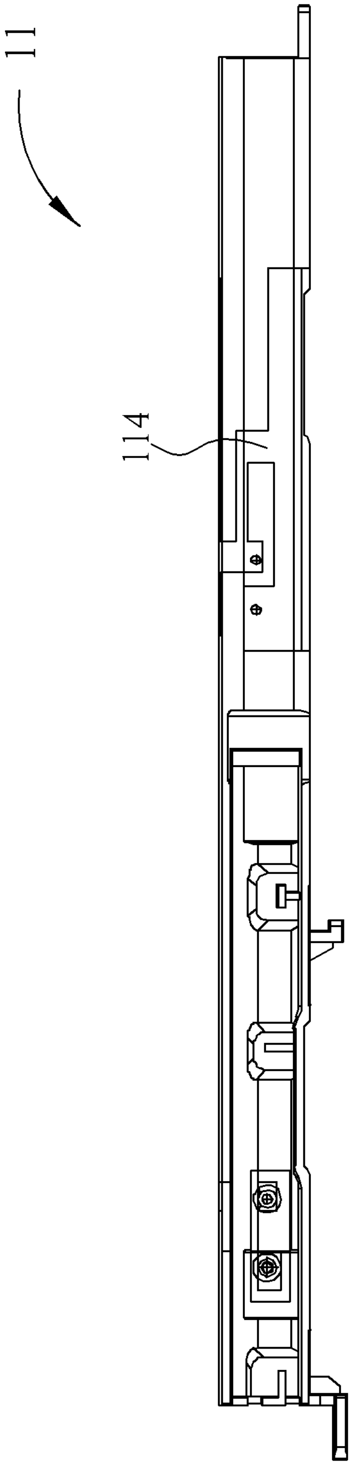

Besides, the above embodiments aim at how to increase isolation between two antennas by different arrangements. In practice, the applicable range of the present invention is not limited to the two antennas, and the same concept can further be applied to more than two antennas of the same type. Operations can be summarized into a process 90, as shown in FIG. 9. The process 90 is utilized for enhancing antenna isolation, and includes the following steps:

Step 900: Start.

Step 902: Design a plurality of antennas of a same type according to an operating frequency band of a wireless communication device.

Step 904: Forming the plurality of antennas in an antenna disposition area of the wireless communication device by different arrangements, for receiving or transmitting a plurality of wireless signals of the operating frequency band.

Step 906: End.

According to the process 90, when the wireless communication device is capable of simultaneously receiving or transmitting multiple wireless signals of the same frequency band, such as support MIMO or support different wireless communication systems with the same frequency band (e.g. Bluetooth and Wi-Fi), the present invention forms the corresponding antennas in the antenna disposition area of the wireless communication device with different arrangements, so as to enhance isolation by the different arrangements, and avoid collision when simultaneously receiving or transmitting wireless signals, thereby increasing antenna efficiency, and maintain throughput.

To sum up, the present invention uses different antenna arrangements, to increase antenna isolation under limited space, so as to increase antenna efficiency, and maintain throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) device, for a wireless communication device, comprising:

an antenna disposition area; and a plurality of antennas, having a same type, and formed in the antenna disposition area by different arrangements, for receiving or transmitting a plurality of wireless signals of a same frequency band;

wherein a plurality of arrangements of the plurality of antennas are defined according to a direction from a radiating element to a grounding terminal of each of the plurality of antennas.

2. The RF device of claim 1, wherein the plurality of antennas support a multi-input multi-output (MIMO) communication system.

3. The RF device of claim 1, wherein the wireless communication device is a laptop, and the antenna disposition area is a hinge area in the laptop.

4. The RF device of claim 1, wherein the plurality of antennas are planar inverted-F antennas, dipole antennas, foldable dipole antennas or slot antennas.

5. The RF device of claim 1, wherein the antenna disposition area is disposed on a front side and a back side of a tubular mechanism of the wireless communication device.

6. A wireless communication device, comprising:

a radio-frequency (RF) signal processing device, for processing a plurality of RF signals of a same frequency band; and an RF device, comprising:

an antenna disposition area; and a plurality of antennas, having a same type, and formed in the antenna disposition area by different arrangements and coupled to the RF signal processing device, for receiving or transmitting the plurality of wireless signals;

wherein a plurality of arrangements of the plurality of antennas are defined according to a direction from a radiating element to a grounding terminal of each of the plurality of antennas.

7. The wireless communication device of claim 6, wherein the plurality of antennas support a multi-input multi-output (MIMO) communication system.

8. The wireless communication device of claim 6, wherein the wireless communication device is a laptop, and the antenna disposition area is a hinge area in the laptop.

9. The wireless communication device of claim 6, wherein the plurality of antennas are planar inverted-F antennas, dipole antennas, foldable dipole antennas or slot antennas.

10. The wireless communication device of claim 6, wherein the antenna disposition area is disposed on a front side and a back side of a tubular mechanism of the wireless communication device.

11. A method for enhancing antenna isolation, comprising:

designing a plurality of antennas of a same type according to an operating frequency band of a wireless communication device; and forming the plurality of antennas in an antenna disposition area of the wireless communication device by different arrangements, for receiving or transmitting a plurality of wireless signals of the operating frequency band;

wherein a plurality of arrangements of the plurality of antennas are defined according to a direction from a radiating element to a grounding terminal of each of the plurality of antennas.

12. The method of claim 11, wherein the plurality of antennas support a multi-input multi-output (MIMO) communication system.

13. The method of claim 11, wherein the wireless communication device is a laptop, and the antenna disposition area is a hinge area in the laptop.

14. The method of claim 11, wherein the plurality of antennas are planar inverted-F antennas, dipole antennas, foldable dipole antennas or slot antennas.

15. The method of claim 11, wherein the antenna disposition area is disposed on a front side and a back side of a tubular mechanism of the wireless communication device.

* * * * *